July 18, 1939.　　　　M. B. BENSON　　　　2,166,206
COMBINATION HAND AND POWER STEERING APPARATUS
Filed March 12, 1937　　　4 Sheets-Sheet 1
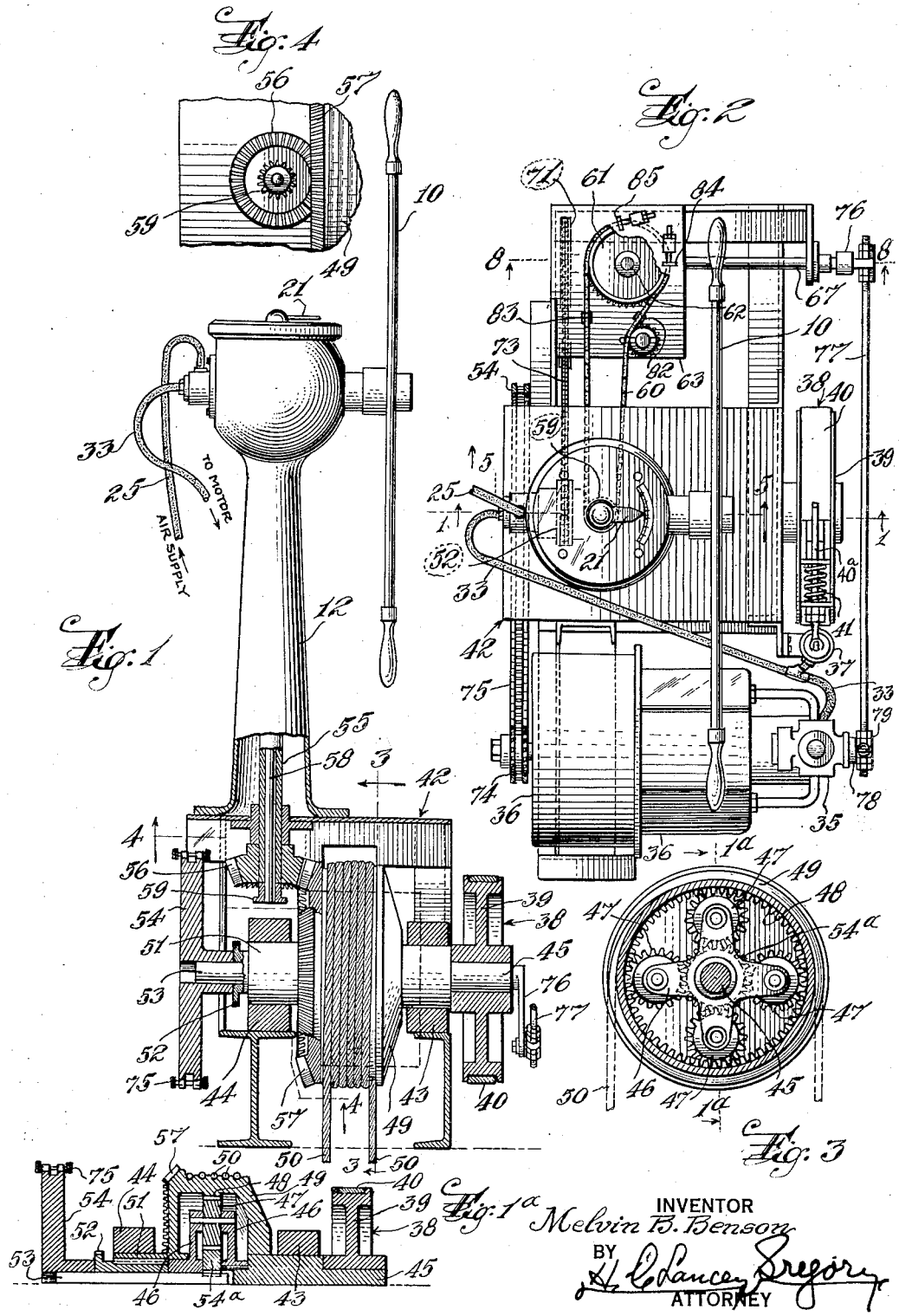
INVENTOR
Melvin B. Benson
BY
ATTORNEY July 18, 1939.  M. B. BENSON  2,166,206

COMBINATION HAND AND POWER STEERING APPARATUS

Filed March 12, 1937  4 Sheets-Sheet 2

INVENTOR
Melvin B. Benson
BY
ATTORNEY

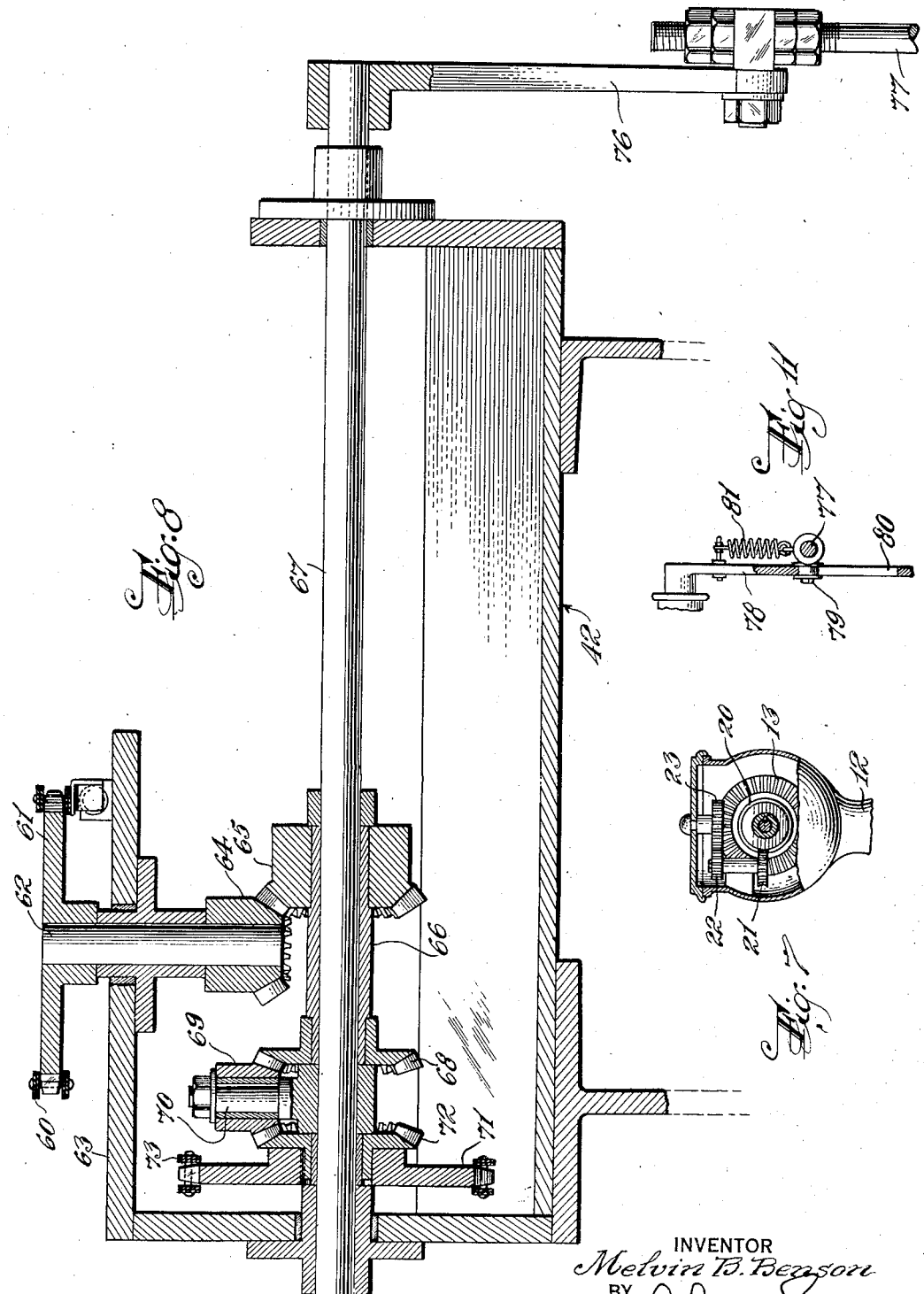

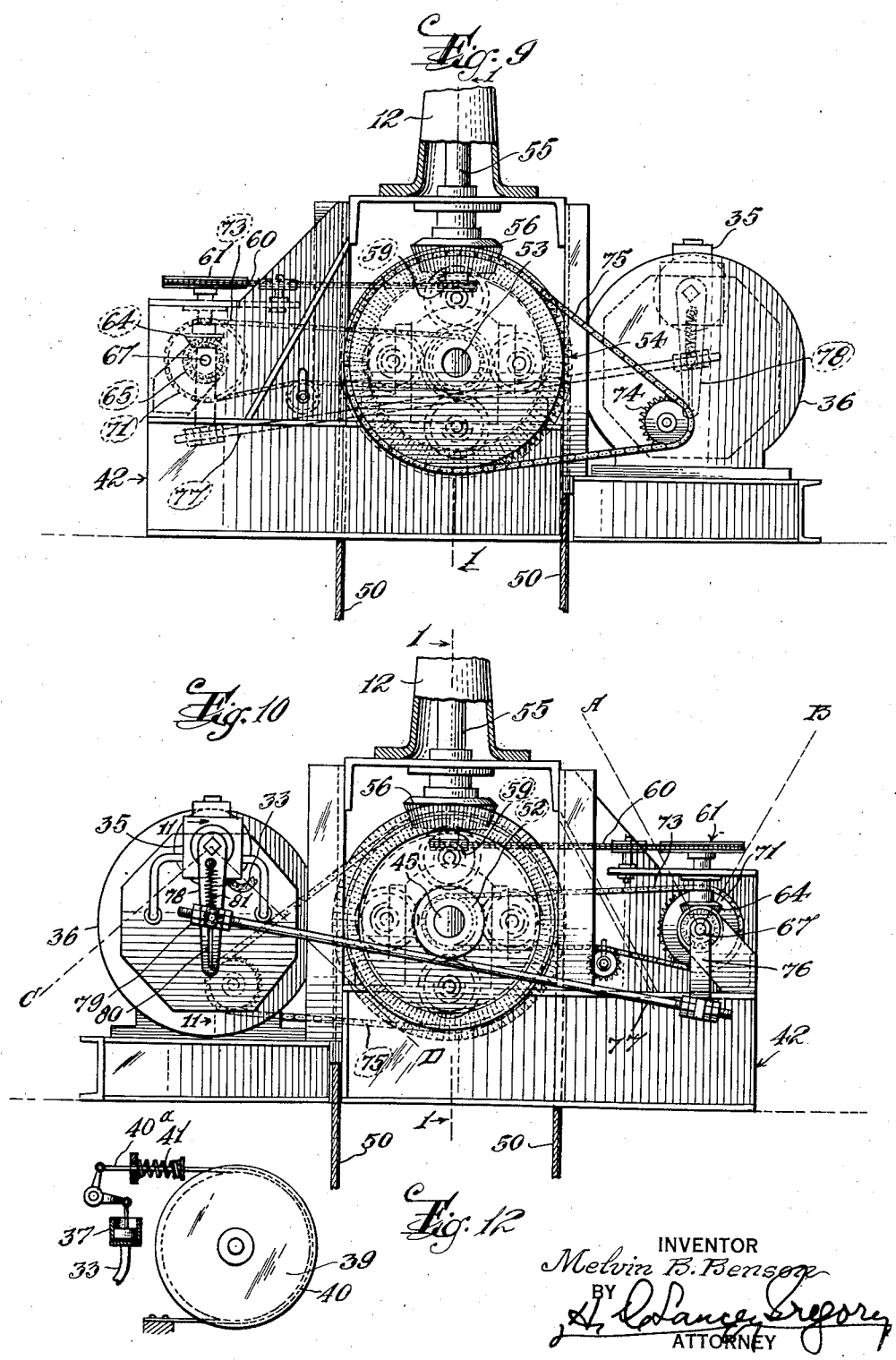

Patented July 18, 1939

2,166,206

UNITED STATES PATENT OFFICE 2,166,206

COMBINATION HAND AND POWER STEERING APPARATUS

Melvin B. Benson, New York, N. Y., assignor to Lidgerwood Manufacturing Company, Elizabeth, N. J., a corporation of New York Application March 12, 1937, Serial No. 130,509

11 Claims. (Cl. 114—146)

My invention relates to improvements in combination hand and power steering apparatus, and more particularly to such apparatus for controlling the rudder of boats.

One of the objects of my invention is the provision of improved steering apparatus of the character described embodying a hand-wheel from which the rudder can be controlled either directly or by power, and which in either case is accurate, reliable in operation, and responsive to slight movements of the hand-wheel in either direction.

Another object of my invention is the provision of improved steering apparatus of the character described which is inexpensive and simple in construction and manner of operation, as compared to the various constructions of steering apparatus used heretofore.

Other objects and advantages will hereinafter appear.

For the purpose of illustrating my invention, an embodiment thereof is shown in the drawings, in which Figure 1 is a side elevational view, partly in section, of steering apparatus constructed and operating in accordance with my invention, the section being taken on the line 1—1 in Figs. 2, 9 and 10;

Fig. 1a is a section on the line 1a—1a in Fig. 3;

Fig. 2 is a plan view of Fig. 1, partly broken away;

Fig. 3 is a section on the line 3—3 in Fig. 1;

Fig. 4 is a section on the line 4—4 in Fig. 1;

Fig. 7 is a section on the line 7—7 in Fig. 5, on a reduced scale;

Fig. 8 is an enlarged sectional view, the section being taken on the line 8—8 in Fig. 2;

Fig. 9 is a side elevational view, looking toward the right in Fig. 2;

Fig. 10 is a side elevational view, looking toward the left in Fig. 2;

Fig. 11 is an elevational view partly in section and looking toward the right in Fig. 10, the section being taken on the line 11—11 in Fig. 10; and Fig. 12 is a simplified, diagrammatic showing of the friction brake, looking toward the left in Fig. 2.

Figure 5:
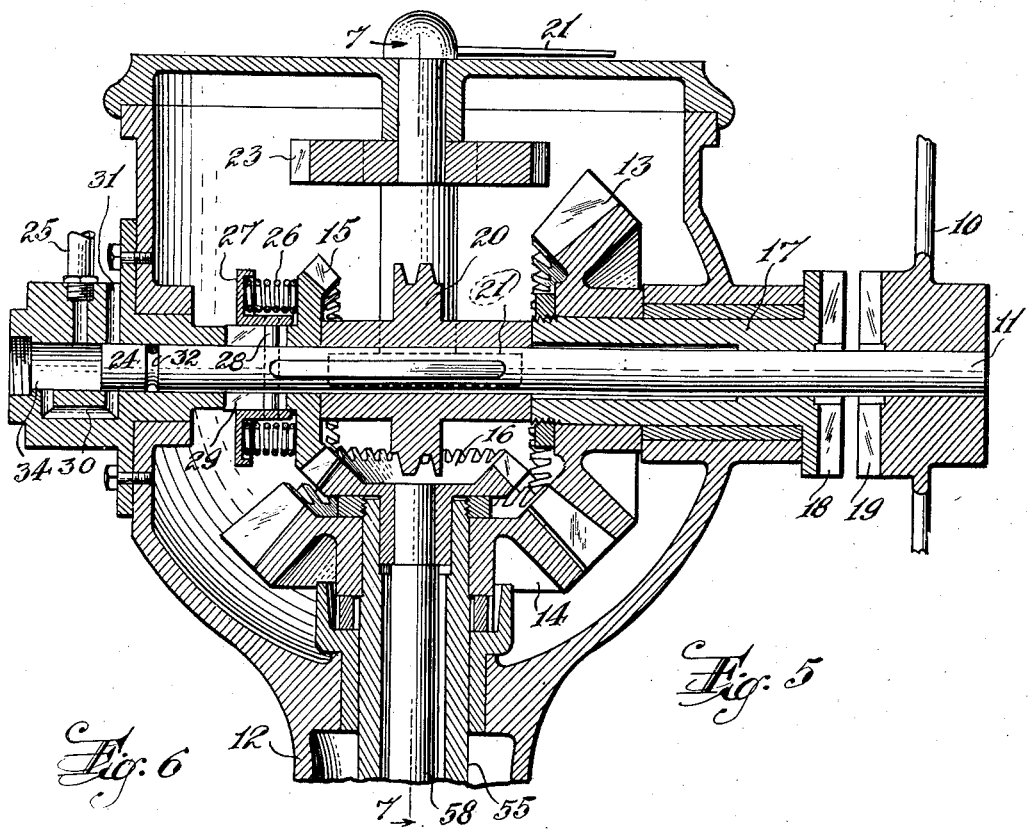
Fig. 5 is an enlarged sectional view showing the respective positions of the actuating parts for power steering, the section being taken on the line 5—5 in Fig. 2.
Figure 6:
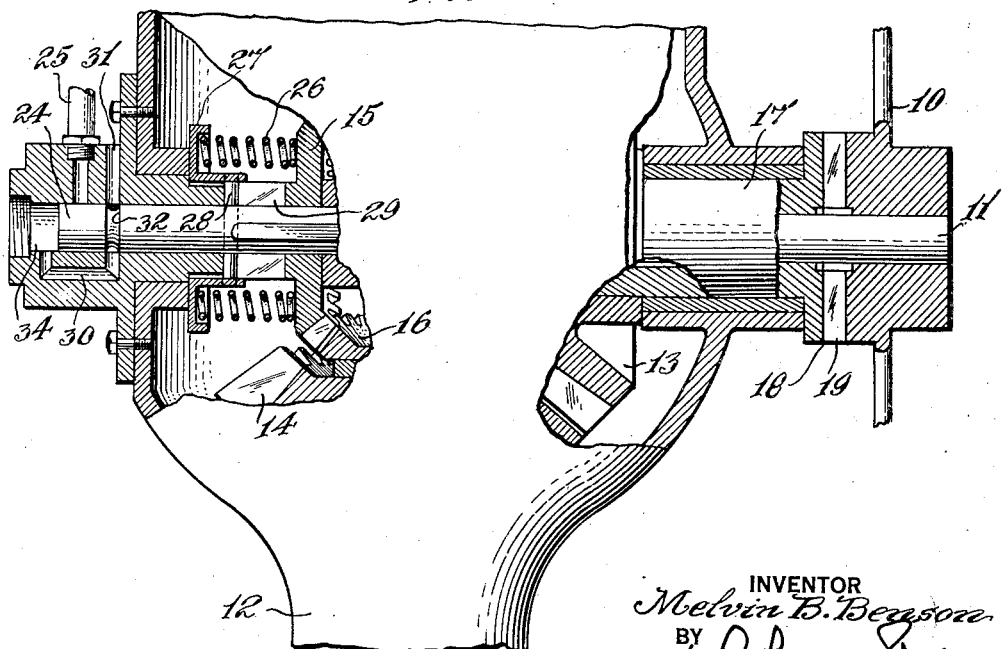
Fig. 6 is a view similar to Fig. 5, showing the respective positions of the actuating parts for direct, hand steering.

With reference to Figs. 1 to 6, the reference numeral 10 designates a hand-wheel fixed on one end of a shaft 11 which is journaled in the head of a hollow pedestal or post 12 and is movable axially whereby the hand-wheel can be pulled in the direction toward the helmsman to place it in a first position for power steering, as shown in Fig. 5, or pushed in the direction away from the helmsman to place the hand-wheel in a second position for hand steering, as shown in Fig. 6.

Located in the head of the pedestal 12 are meshing bevel gears 13 and 14 and meshing bevel gears 15 and 16. The bevel gear 13 is fixed on a sleeve 17 journaled in the pedestal head and disposed on and having a sliding fit with respect to the shaft 11, and provided with clutch teeth 18 which mesh with complementary clutch teeth 19 on the hub of the hand-wheel when the latter is in the second position thereof for hand steering, as shown in Fig. 6. The bevel gear 15 is splined on the shaft 11, as represented. Also splined on the shaft 11, and disposed between the bevel gears 13 and 15, is a worm 20 which drives an indicating pointer 21 through a worm gear 21' and gears 22 and 23 as more clearly shown in Fig. 7. The pointer 21 moves over a fixed scale, shown in Fig. 2, to indicate the rudder angle.

The hand-wheel 10 is yieldingly held in the first position thereof for power steering, as shown in Fig. 5, by compressed air acting on the opposite end 24 of the shaft 11 and supplied from a hose or other connection 25. In this position of the hand-wheel, the pressure of the air and the area of the shaft end 24 are sufficient to overcome the force of a spring 26 compressed as shown, between the bevel gear 15 and a collar 27 fixed to the shaft 11 by a pin 28 which has a sliding fit in a slot 29 in the hub of the gear 15.

When the hand-wheel 10 is moved to the second position thereof for hand steering, as shown in Fig. 6, the end portion 24 of the shaft 11 is simultaneously moved into position to shut off the air supply, and air-pressure in front of this end of the shaft is reduced to atmospheric pressure on account of the passage 30 and a vent 31, both of which then register with an annular groove 32 in the end portion 24 of the shaft. With the air pressure on the left-hand end of the shaft 11 relieved, the force of the spring 26 is now sufficient to yieldingly hold the hand-wheel 10 in its second position for hand steering.

From the foregoing it will be seen that the end portion 24 of the shaft 11 constitutes a valve or valve means to either apply compressed air to hold the hand-wheel 10 yieldingly in its first position as shown in Fig. 5, for power steering, or to relieve the air pressure to permit the spring 26 to hold the hand-wheel yieldingly in its second position as shown in Fig. 6, for hand steering.

With the valve 24 in the position shown in Fig. 5, compressed air is also supplied, by way of a hose or other connection 33 leading from the chamber 34 in front of this valve, to the valve 35 of a reversible, rotary, compressed-air motor 36 of a conventional design, and to the air cylinder 37 of a friction brake 38 of a conventional design.

The brake 38 comprises a brake drum 39 about which is a brake band 40 having one end thereof fixed and its other, free end connected by a rod 40a to the piston rod of the cylinder 37. A compressed spring 41 on the rod 40a operates to release the brake band 40, whereas the compressed air, when supplied by the connection 33 to the cylinder 37, operates to apply the brake band 40 to the brake drum 39 against the action of the spring 41, whereupon the brake drum 39 is held against rotation. In other words, the friction brake 38 is spring-released and air-applied, as will be well understood by those skilled in the art.

With the valve 24 in the position shown in Fig. 6, the compressed air is not only shut off from the air motor 36 and the brake cylinder 37, but the air-supply connection 33 to the motor and cylinder is opened to the atmosphere by way of the passages 30 and 31 registering with the groove 32. The spring 41 then is effective to release the brake and permit the brake drum 39 to rotate freely.

The pedestal 12 is mounted on a supporting frame designated generally by the reference numeral 42, and which is provided with bearings 43 and 44. A shaft 45 is journaled in the bearing 43, and the brake drum 39 is fixed on the reduced end of this shaft which extends outwardly beyond one side of this bearing. Also fixed on the shaft 45, and disposed on the other side of the bearing 43, is a spider 46 carrying the planet gears 47 of a planetary gear. The ring gear 48 of the planetary gear is disposed in and fixed with respect to a steering member in the form of a drum 49 for the cable 50 which is connected in the usual manner to the rudder (not shown). The drum or member 49 is provided with a stub or extension 51 journaled in the bearing 44 and to which is fixed a sprocket gear 52. Journaled in the sprocket gear 52 and extending loosely through the adjacent side of the spider 46, is a shaft 53 on one end of which is fixed a sprocket gear 54. On the other end of the shaft 53 is fixed the sun gear 54a of the planetary gearing.

With the spring 26 holding the hand-wheel in the position shown in Fig. 6 with the clutch teeth 18 and 19 engaging for hand steering, a positive mechanical connection between the hand-wheel and the steering member or drum 49 is provided by a hollow shaft 55 journaled in the pedestal 12, the bevel gear 14 which is fixed on the upper end of the shaft 55, a bevel gear 56 fixed on the lower end of the shaft 55, and a bevel gear 57 meshing with the gear 56 and fixed to the adjacent face of the drum 49 or milled directly therefrom. In this position of the hand-wheel, also, the brake 38 is released, and the compressed air to the motor 36 is shut off.

The bevel gear 16 is fixed on the upper end of a shaft 58 which is journaled in the hollow shaft 55. A sprocket gear 59 is fixed on the lower end of the shaft 58 and is connected by a sprocket chain 60 to a sprocket gear 61 which is fixed on a stud shaft 62 journaled in one of the members 63 of the frame 42, as shown. Also fixed on the shaft 62 is a bevel gear 64 which meshes with a bevel gear 65. The gear 65 is fixed on a sleeve 66 disposed on and having a sliding fit on a shaft 67 journaled in the frame 42. A bevel gear 68, which is also fixed on the sleeve 66, meshes with a bevel gear 69 journaled on a stud 70 keyed or otherwise fixed to the shaft 67.

A sprocket gear 71 and a bevel gear 72 are fixed with respect to each other for rotation together, and are mounted loosely on the shaft 67. A sprocket chain 73 connects the sprocket gears 71 and 52.

A sprocket gear 74 fixed on the power shaft of the air motor 36, is connected by a sprocket chain 75 to the sprocket gear 54.

Fixed on the shaft 67 is a lever 76 connected by a rod 77 to the valve lever 78 of the air motor. As represented in Fig. 8, there is a pivotal connection between the lever 76 and the adjacent end of the rod 77. The other end of the rod 77 is pivotally connected to the valve lever 78 by an adapter or suitable fitting 79 which has a sliding fit in a slot 80 in the valve lever, for the purpose hereinafter explained. A tensioned spring 81, having one end thereof fixed to the valve lever and its other end fixed to the fitting 79, operates always to pull the latter toward the upper end of the slot 80.

With the valve lever 78 in the neutral position thereof shown more clearly in Figs. 9 and 10, compressed air to the motor 36 is shut off. It will be understood that rotation of the shaft 67 in one direction causes movement of the valve lever to one side of the neutral position, which causes the motor to operate in one direction, and that rotation of the shaft 67 in the other direction causes movement of the valve lever to the other side of the neutral position, which causes the motor to operate in the other direction.

As explained, for power operation the hand-wheel is pulled toward the helmsman to the first position thereof shown in Fig. 5. The clutch teeth 18 and 19 are then disengaged, and the valve 24 is open to admit compressed air to the motor and to the cylinder 37 to apply the brake 38 whereby the planet gears 47 are held against bodily movement about the axis of the shaft 45.

Assuming that the helmsman is holding his course by holding the hand-wheel 10 in any given position, the cable drum 49 and the rudder will be in the corresponding angular positions thereof. With the helmsman holding the hand-wheel stationary, the gear 68 in Fig. 8 will also be held stationary on account of the direct mechanical connection between this gear and the hand-wheel through the shaft 11, gears 15 and 16, shaft 58, sprocket gear 59, sprocket chain 60, sprocket gear 61, shaft 62, bevel gears 64 and 65, and the sleeve 66 on which gears 65 and 68 are fixed. If, now, the rudder and the steering drum 49 move even a slight amount to one side or the other of their present positions, the bevel gear 72 in Fig. 8 will be rotated in the corresponding direction on account of the connection between this gear and the drum 49 through the sprocket gear 52, sprocket chain 73, and the sprocket gear 71. The bevel gear 69 will accordingly be rotated to cause rotation of the valve-actuating shaft 67 in one direction or the other, as the case might be, since the bevel gear 68 is being held stationary and is therefore a fixed, circular rack with respect to the rotating bevel gear 69. This rotation of the valve-actuating shaft 67 moves the valve lever 78 to one side of the neutral position to cause operation of the motor in the proper direction to drive the sun gear 54a through the sprocket gear 74, sprocket chain 75, the sprocket gear 54, and shaft 53, whereupon the cable drum is rotated back to return the rudder to the position from which it had moved, and the bevel gear 72 is also rotated back to return the motor valve 35 to its neutral position in the manner and through the connections described.

In like manner, if the helmsman wishes to change the angular position of the rudder, he rotates the hand-wheel 10 in one direction or the other to rotate the bevel gear 68 through a corresponding angle, which causes similar rotation of the bevel gear 69. Since the bevel gear 72 can now be considered as being a fixed, circular rack with respect to the rotating bevel gear 69, it will be seen that the valve-actuating shaft 67 is rotated to cause the motor 36 to operate as required and drive the sun gear 54a to turn the drum 49. As the drum 49 now turns, it drives the bevel gear 72 back to return the valve lever 78 to the neutral position thereof, and the angle through which the drum must turn to do this depends upon the angle through which the bevel gear 68 was rotated by the helmsman.

From the foregoing it will be seen that the gearing between the steering drum 49 and the valve-actuating shaft 67, and comprising the gears 52, 71, 72 and 69, and the sprocket chain 73, constitute follow-up mechanism or means by which the valve lever 78 is always caused to move in a direction toward its neutral position regardless of which way the air motor is operating.

An important feature of my improved construction resides in the connecting means between the valve-actuating shaft 67 and the motor valve 35. In this connection, it will be seen that with the valve lever 78 in the neutral position thereof shown in Figs. 9 and 10, the effective lever-arm, measured from the axis of shaft 67 to the pivotal connection with the rod 77, is substantially greater than the effective lever-arm measured from the valve axis to the pivotal connection or fitting 79. On account of this arrangement or relation, rotation of the valve-actuating shaft 67 through a relatively small angle in either direction from the neutral position, causes rotation of the motor valve through a substantially greater angle, whereby the valve is opened quickly. However, as the lever 76 is rotated away from its neutral position in either direction at a uniform rate, the valve lever 78 moves away from its neutral position at a decreasing rate, as will be apparent from a layout of the velocity diagram. In like manner, as the valve-actuating shaft 67 and the lever 76 fixed thereto are being returned at a uniform rate from either direction to the neutral position shown in Figs. 9 and 10, the valve lever 78 moves toward its neutral position at an increasing rate, so that as the lever 76 moves into neutral position the motor valve is closed quickly.

As the valve lever 78 moves to either side of its neutral position, the spring 81 gives to permit the fitting 79 to slide along the slot 80 as might be required to allow for the difference in the effective lever-arms at opposite ends of the connecting rod 77. With the lever 76 in its neutral position, however, the fitting 79 is held at the extreme upper end of the slot by the spring 81 so that there will always be the sensitivity of control in the manner and for the purpose explained.

From the foregoing it will be seen that the valve-actuating mechanism is very sensitive or responsive to relatively slight movements of the hand-wheel 10 and to the steering drum 49 in either direction from any particular angular position. For example, upon a relatively slight angular change in the position of the hand-wheel, the motor valve opens quickly to cause operation of the motor to rotate the rudder drum 49. As the rudder drum 49 rotates into the corresponding angular position, the motor valve is moved quickly to its closed or neutral position by the action of the follow-up mechanism, as explained, and if the drum 49 overtravels, the follow-up mechanism causes the motor valve to overtravel also a corresponding amount, whereupon the motor reverses to rotate the drum back until the motor valve is in its neutral or shut-off position. With the hand-wheel held stationary by the helmsman to hold the course, a relatively slight angular movement of the drum 49 and the rudder in either direction from a given, desired position, causes the motor valve to open quickly and operate the motor in the proper direction to bring the drum and rudder back to this position.

The sprocket chain 60 is provided with protruding lugs 82 and 83 which engage fixed stops 84 and 85, respectively, to limit the angular positions to which the valve-actuating lever 76 can be rotated by turning the hand-wheel hard over for a sharp maneuver to starboard or port. With reference to Fig. 10, the extreme positions of the lever 76 from opposite sides of its neutral position are represented by the broken lines A and B. The positions of the valve lever 78 when the lever 76 is in the positions A and B, are represented by the broken lines C and D, respectively.

Another important feature of my improved construction resides in the fact that with the hand-wheel in the second position for hand steering, as shown in Fig. 6, the bevel gears 15 and 16 are still in mesh with each other. Therefore, for any given angular movement of the hand-wheel in either direction, both the similar bevel gears 68 and 72 in Fig. 8 will be rotated through the same angle, but in opposite directions, the various gears being of the correct relation with respect to each other to cause such movement. For this reason, although the associated bevel gear 69 rotates with the gears 15 and 16, no bodily movement of the gear 69 about the axis of shaft 67 takes place. It will therefore be seen that regardless of any manipulation of the hand-wheel in the second position thereof for hand steering, the motor valve 35 and the rod 77 and levers 76 and 78 connecting it to the shaft 67, will remain in the neutral position shown in Figs. 9 and 10, in which position the compressed air supply to the motor is shut off by the valve 35. The advantages of this action are two-fold. First, compressed air can, if desired, be kept on the valve 35 even during hand steering, in which case a direct connection would be made from the air supply to the valve 35, rather than through the chamber 34. Second, since the motor valve and associated parts remain in the neutral position during hand steering, the hand-wheel can be moved to the first position thereof for power steering from any angular position, instead of it being necessary to first turn it back to the neutral or "straight-ahead" position as has been necessary in the various constructions proposed heretofore.

In the claims, the term "hand-wheel" is used in the broad sense, and is intended to include any element or member which, although not necessarily in the form or shape of a wheel, serves the same purpose.

While but one embodiment of my invention has been disclosed, it will be understood that various modifications, such as in the size, shape and arrangement of the parts, are possible without departing from the spirit of my invention or the scope of the claims.

I claim as my invention:

1. In steering apparatus for optional hand or power-actuation of a member, a drum, a rotatable hand-wheel supported for bodily movement along its axis of rotation to a first position for power-operation of said drum and to a second position for hand-operation of said drum, a motor for operating said drum, means for controlling said motor, connecting means between said motor-control means and said hand-wheel for power-operation of said drum under control of said hand-wheel, connecting means providing a constant and positive mechanical connection between said motor-control means and said drum, said first-named connecting means and said second-named connecting means being effective respectively to cause actuation of said motor-control means in opposite senses upon any control movement of said hand-wheel in either direction, and means operating only when said hand wheel is in said second position thereof to effect a positive mechanical connection between said hand-wheel and said drum for direct hand-operation of the latter from said hand-wheel.

2. In apparatus for optional hand or power-actuation of a steering member, a hand-wheel, a drum, a motor for operating said drum, means for controlling said motor, means providing a connection between said hand-wheel and said motor-control means for power-operation of said drum under control of said hand-wheel, means for effecting a positive mechanical connection between said hand-wheel and said drum for hand-operation of the latter from said hand-wheel, and means forming part of said second-named means and operating to maintain the connection between said hand-wheel and said motor-control means during hand-operation of said apparatus.

3. In apparatus for optional hand or power-actuation of a steering member, a drum, a rotatable hand-wheel supported for bodily movement along its axis of rotation to a first position for power-operation of said drum and to a second position for hand-operation of said drum, a motor for operating said drum, means for controlling said motor, means providing a connection between said hand-wheel and said motor-control means for power-operation of said drum under control of said hand-wheel, means forming part of said second-named means and operating to maintain the connection between said hand-wheel and said motor-control means in either of said positions of said hand-wheel, and means operating when said hand-wheel is in said second position thereof to effect a positive mechanical connection between said hand-wheel and said drum for hand-operation of the latter from said hand-wheel.

4. In apparatus for optional hand or power-actuation of a steering member, a hand-wheel, a drum, a reversible motor for operating said drum, means having a neutral position and movable to opposite sides thereof to effect operation of said motor in opposite directions respectively, follow-up mechanism for actuating said means to effect such operation of said motor, means connecting said hand-wheel and said follow-up mechanism for power-operation of said drum under control of said hand-wheel, means for effecting a positive mechanical connection between said hand-wheel and said drum for hand-operation of the latter from said hand-wheel, and means forming part of said second-named means and operating to maintain the connection between said hand-wheel and said follow-up mechanism during hand-operation of said apparatus.

5. In apparatus for optional hand or power-actuation of a steering member, a drum, a rotatable hand-wheel supported for bodily movement along its axis of rotation to a first position and to a second position, a reversible motor for operating said drum, means having a neutral position and movable to opposite sides thereof to effect operation of said motor in opposite directions respectively, follow-up mechanism for actuating said means to effect such operation of said motor, means connecting said hand-wheel and said follow-up mechanism for power-operation of said drum under control of said hand-wheel, means forming part of said second-named means and operating to maintain the connection between said hand-wheel and said follow-up mechanism in either of said positions of said hand-wheel, and means operating when said hand-wheel is in said second position thereof to effect a positive mechanical connection between said hand-wheel and said drum for hand-operation of the latter from said hand-wheel.

6. In apparatus for optional hand or power-actuation of a steering member, a hand-wheel, a drum, a fluid-pressure motor for operating said drum, valve means for controlling said motor, means including planetary gearing for driving said drum by said motor and comprising a ring gear fixed with respect to said drum and a sun gear connected to said motor and planet gears, means providing a connection between said hand-wheel and said valve means for power-operation of said drum under control of said hand-wheel, means for effecting a positive mechanical connection between said hand-wheel and said drum for hand-operation of the latter from said hand-wheel, and fluid-pressure means for holding said planet gears against bodily movement during hand-operation of said apparatus.

7. In apparatus for optional hand or power-actuation of a steering member, a hand-wheel, a drum, a reversible motor for operating said drum, means having a neutral position and movable to opposite sides thereof to effect operation of said motor in opposite directions respectively, follow-up mechanism for actuating said means; said follow-up mechanism comprising a rotatable shaft, a bevel gear carried by said shaft and fixed against rotation bodily with respect to said shaft and rotatable about an axis perpendicular to the shaft axis, and a pair of bevel gears meshing with said first-named gear and supported for rotation about the axis of said shaft and relatively with respect to each other; means for connecting said hand-wheel and one of said pair of bevel gears for power-operation of said drum under control of said hand-wheel, and means for effecting a positive mechanical connection between said hand-wheel and said drum for direct hand-operation of the latter from said hand-wheel.

8. In apparatus for optional hand or power-actuation of a steering member, a hand-wheel, a drum, a reversible motor for operating said drum, means having a neutral position and movable to opposite sides thereof to effect operation of said motor in opposite directions respectively, follow-up mechanism for actuating said means; said follow-up mechanism comprising a rotatable shaft, a bevel gear carried by said shaft and fixed against rotation bodily with respect to said shaft and rotatable about an axis perpendicular to the shaft axis, and a pair of bevel gears meshing with said first-named gear and supported for rotation about the axis of said shaft and relatively with respect to each other; means connecting said hand-wheel and one of said pair of bevel gears for power-operation of said member under control of said hand-wheel, means for effecting a direct mechanical connection between said hand-wheel and said drum for direct hand-operation of the latter from said hand-wheel, and means connecting said drum and the other of said pair of bevel gears to maintain said first-named means in its neutral position during hand-operation of said apparatus and to return said first-named means to its neutral position following any movement of said hand-wheel during power-operation of said apparatus.

9. In apparatus for optional hand or power-actuation of a steering member, a drum, a rotatable hand-wheel supported for bodily movement along its axis of rotation to a first position and to a second position, a motor for operating said drum, means for controlling said motor, means operating when said hand-wheel is in said first position thereof to effect a connection between said hand-wheel and said motor-control means for power-operation of said drum under control of said hand-wheel, means operating when said hand-wheel is in said second position thereof to effect a positive mechanical connection between said hand-wheel and said drum for direct hand-operation of the latter from said hand-wheel, fluid-pressure means for holding said hand-wheel yieldingly in said first position thereof, and spring means for holding said hand-wheel in said second position thereof.

10. In apparatus for optional hand or power-actuation of a steering member, a hand-wheel, a drum, a bevel gear fixed with respect to said drum, a motor for operating said drum, means for controlling said motor, means for effecting a positive mechanical connection between said hand-wheel and said drum for hand-operation of the latter from said hand-wheel and comprising a hollow shaft, a bevel gear fixed on said shaft and meshing with said first-named gear, and means for connecting said hand-wheel and said shaft; means for controlling said motor, and means providing a connection between said hand-wheel and said motor-control means for power-operation of said drum under control of said hand-wheel and comprising a shaft disposed in said hollow shaft, means connecting one end of said second-named shaft to said motor-control means, and means connecting the other end of said second-named shaft to said hand-wheel.

11. In apparatus for optional hand or power-actuation of a steering member, a pedestal, a shaft journalled in said pedestal, a hand-wheel fixed on said shaft, a drum, a bevel gear fixed with respect to said drum, a motor for operating said drum, means for controlling said motor; means for effecting a positive mechanical connection between said hand-wheel and said drum for hand-operation of the latter from said hand-wheel and comprising a hollow shaft, a bevel gear fixed on said shaft and meshing with said first-named gear, and means connecting said shafts; means for controlling said motor; and means providing a connection between said hand-wheel and said motor-control means for power-operation of said drum under control of said hand-wheel and comprising a shaft disposed in said hollow shaft, means connecting one end of said third-named shaft to said motor-control means, and means connecting the other end of said third-named shaft to said first-named shaft.

MELVIN B. BENSON.